United States Patent

[11] 3,575,049

[72] Inventor Thomas J. Boland
 Idaho Falls, Idaho
[21] Appl. No. 1,482
[22] Filed Jan. 8, 1970
[45] Patented Apr. 13, 1971
[73] Assignee The United States of America as represented by the United States Atomic Energy Commission

[54] SONIC FLOW METER
 5 Claims, 1 Drawing Fig.
[52] U.S. Cl. .................................................... 73/194
[51] Int. Cl. .................................................. G01p 5/00
[50] Field of Search ........................................ 73/194 (A), 189, 181

[56] References Cited
UNITED STATES PATENTS
2,991,650 7/1961 Katzenstein et al. .......... 73/194
3,109,112 10/1963 Lester .......................... 73/194
3,473,378 10/1969 Yoshiyama et al. .......... 73/194
FOREIGN PATENTS
891,529 3/1962 Great Britain ................ 73/194

Primary Examiner—Charles A. Ruehl
Attorney—Roland A. Anderson

ABSTRACT: A device for measuring the velocity and direction of flow of a fluid uses a pressure wave signal which is transmitted both upstream and downstream. The resulting signals are mixed to form a single signal having a phase angle representative of the speed and direction of flow.

Patented April 13, 1971
3,575,049
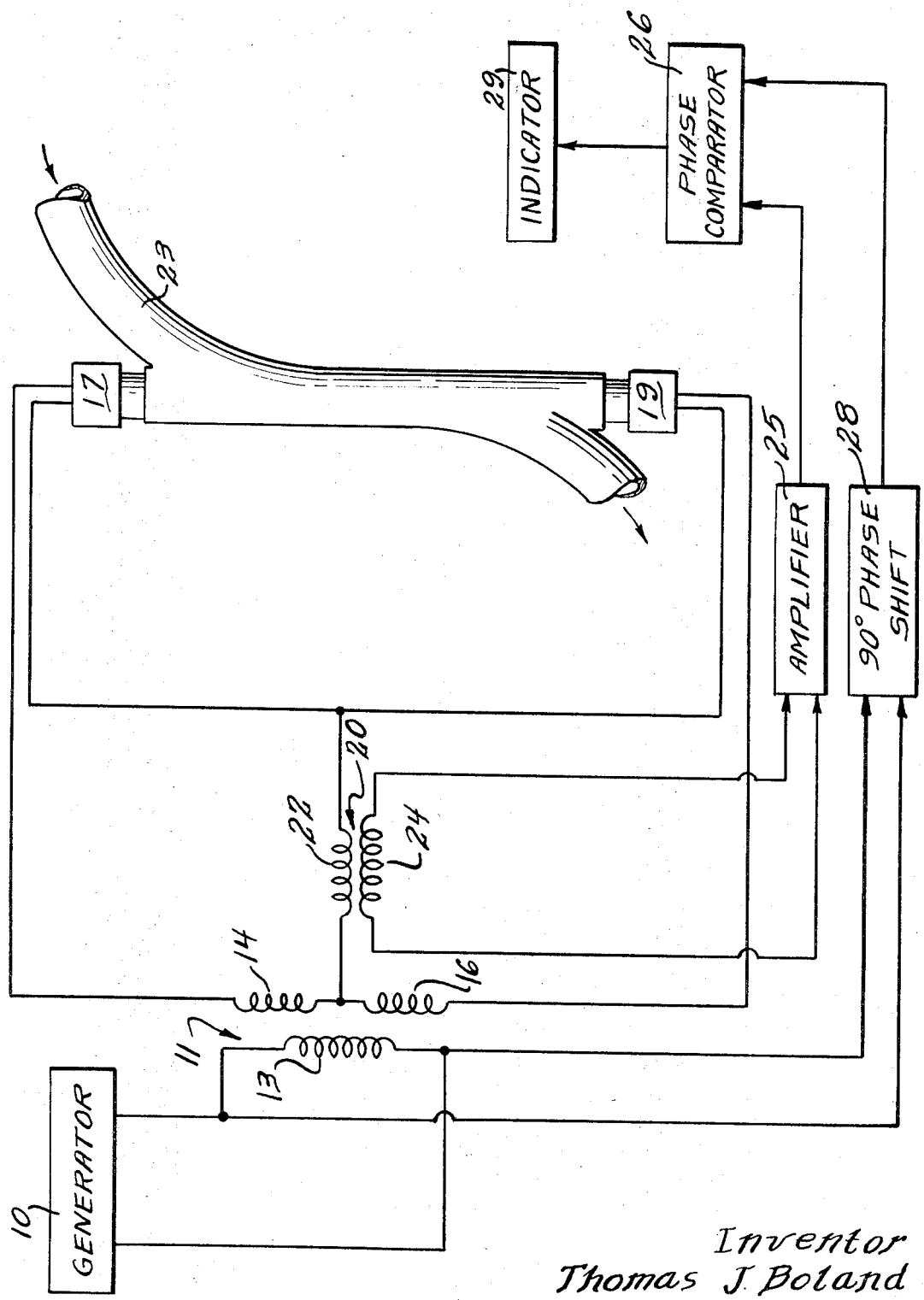
Inventor
Thomas J. Boland
By Roland A. Anderson
Attorney

SONIC FLOW METER

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

The velocity of a fluid flowing in a pipe can be measured by measuring the time delay to a signal transmitted through the fluid between transducers. If the signal is transmitted in the direction of flow of the fluid, or downstream, the time delay is less than if the transmission is in the upstream direction. The greater the velocity of the fluid the greater the time delay difference which occurs. The measurement of the velocity can be made by measuring the phase angle between the transmitted and received signals and subtracting the phase angle displacement caused by the distance between the transmitting and receiving transducers.

The phase angle displacement caused by the distance between the transducers is normally very much greater than the phase angle displacement caused by the flow of the fluid. Thus the above method is subject to errors because of the uncertainty in distance between the transducers. In order to cancel out the error, fluid velocity measuring systems have been devised in which the signal was alternately transmitted upstream and downstream. The alternate system approach also causes problems. These include a requirement for a near perfect switch; wideband amplifiers to switching pulse shape; and long term integration to smooth switching transients.

It is therefore an object of this invention to provide an improved flow meter.

Another object of this invention is to provide a flow meter requiring only narrow-band amplifiers.

Another object of this invention is to provide a flow meter in which little or no integration time is required.

SUMMARY OF THE INVENTION

In practicing this invention a pair of transducers are provided located in the stream of flow of the fluid. An electrical signal is generated and applied to each of the transducers so that one pressure wave signal is transmitted upstream and another pressure wave signal is transmitted downstream simultaneously. Each transducer receives the signal transmitted by the other transducer, develops an electrical signal therefrom and combines it with its own transmitted signal. The signals at each transducer are further combined to form a single signal which is amplifier and applied to a phase comparator. A second input to the phase comparator is a signal having a predetermined phase relationship with the input signal to the transducers. The phase angles between the two signals applied to the phase comparator are a measure of the speed and direction of flow of the fluid. An indicator may be coupled to the phase comparator to give a direct reading of the speed and direction of flow of the fluid.

BRIEF DESCRIPTION OF THE DRAWING

The invention is illustrated in the single drawing, a partial schematic and partial block diagram of the circuit incorporating the features of this invention.

DETAILED DESCRIPTION OF THE INVENTION

Referring to the drawing, there is shown a generator 10 which produces an electrical signal having a frequency in the sonic or ultrasonic range. In normal operation, the frequency chosen would be an ultrasonic frequency. However, the invention is not limited to a frequency in a particular range. Any frequency may be used which can be transmitted through the fluid between two transducers.

The signal from generator 10 is applied to primary winding 13 of transformer 11. Secondary windings 14 and 16 of transformer 11 are coupled to transducers 17 and 19. A common terminal of secondary windings 14 and 16 is coupled to transducers 17 and 19 through, primary winding 22 of transformer 20. Secondary windings 14 and 16 are connected so that the signals across the windings are 180° out of phase.

A fluid, the velocity of which is to be measured, flows through a pipe 23. Transducers 17 and 19 are positioned in pipe 23 so that energy transmitted therebetween flows through the fluid in the same direction as the fluid (downstream) or in the opposite direction (upstream). Thus, in the drawing, energy transmitted from transducer 17 to transducer 19 is transmitted downstream, while energy transmitted from transducer 19 to transducer 17 is transmitted upstream.

Transducers 17 and 19 convert the electrical signals applied thereto to a pressure wave signal which is transmitted through the fluid in pipe 23. An example of a fluid in which velocity measurements were obtained is an acid dissolver used in chemical processes. However, the fluid is not limited to an acid but may be any fluid through which a pressure wave signal can be transmitted.

In operation, the pressure wave signal received by transducer 19 is combined with the signal applied to transducer 19 from secondary winding 16. This combined signal is applied to the primary winding 22 of transformer 20. The pressure wave signal received by transducer 17 from transducer 19 is combined with the signal from secondary winding 14 applied to transducer 17 and this combined signal is applied to primary winding 22. Because of the phase relationship of secondary windings 14 and 16 of transformer 11, the signals applied to primary winding 22 of transformer 20 are in phase opposition and tend to cancel. If the fluid in pipe 23 were stationary, there would be complete cancellation and there would be no resulting signal in secondary winding 24 of transformer 20. If the fluid flows as shown by the direction of arrows in pipe 23, the phase angle of the combined signal from transducer 17 and the phase angle of the combined signal from transducer 19 would be different and thus there would be a small resulting signal developed in secondary winding 24.

The signal developed in secondary winding 24 is amplified in amplifier 25 and applied as one input to a phase comparator 26. The signal from generator 10 is applied to a phase shifter 28 where it is shifted in phase by 90°. The output of phase shifter 28 is also applied to phase comparator 26.

Phase comparator 26, which may be, for example, a balanced modulator, develops a signal having an amplitude and a polarity which is a function of the phase angle between the two input signals. This phase angle, in turn, is a function of the speed and direction of flow of the fluid through pipe 23. This signal may be coupled to an indicator 29 as, for example, a voltmeter, calibrated to read the fluid velocity directly.

The device described is simple and continuous in operation. The pressure wave signals are transmitted both upstream and downstream simultaneously and continuously. Thus there is no requirement for switching and wideband amplifiers are not required to preserve the pulse shape of the signals. The amplifiers required need have a bandwidth only wide enough to accommodate any frequency drift in the system. This results in a greatly improved signal-to-noise ratio. Since very little, if any, integration is necessary, the information is available instantaneously.

The embodiments of the invention in which an exclusive property or privilege is claimed are defined as follows:

I claim:

1. A device for measuring the direction and velocity of flow of a liquid, including in combination, first and second transducers spatially disposed along the line of flow of the fluid to permit the mutual transmission of signals therebetween through the liquid, signal generation means coupled to said first and second transducers and acting to develop first and second signals and apply the same to said first and second transducers respectively, said first and second signals being 180° out of phase, said first and second transducers acting to transmit said first and second signals through the liquid as a pressure wave to said second and first transducers respectively, said first signal and said second transmitted signal being combined at said first transducer to develop a third signal and said second signal and said first transmitted signal being combined at said second transducer to develop a fourth signal, signal combining means coupled to said first and second transducers and being responsive to said third and fourth signals to develop a difference signal, and measuring means coupled to said signal generation means and said signal combining means, said measuring means being responsive to said difference signal and one of said first and second signals to measure the phase angle therebetween, said phase angle being a measure of the velocity and direction of flow of the liquid.

2. The measuring device of claim 1 wherein, the liquid is confined to a pipe with said first and second transducers being positioned within said pipe.

3. The measuring device of claim 2 wherein, the frequency of said first and second signals is ultrasonic.

4. The measuring device of claim 3 wherein, said signal generation means includes a signal generator for developing an output signal of a particular phase and frequency and a first transformer having a primary winding coupled to said signal generator for receiving said output signal therefrom and a pair of secondary windings, said pair of secondary windings being connected in series and having a common terminal, said secondary windings further being connected so that said first signal is developed across one of said secondary windings and said second signal is developed across the other of said secondary windings, said one secondary winding being connected to said first transducer and said other secondary winding being connected to said second transducer, said signal combining means including a second transformer having a first winding connected to said common terminal and to each of said first and second transducers, and a second winding connected to said measuring means, said second transformer acting to develop said difference signal across said second winding in response to said third and fourth signals, and circuit means coupling said measuring means to said first transformer for receiving a signal therefrom having the phase of one of said first and second signals.

5. The measuring device of claim 4 wherein, said measuring means includes 90° phase-shifting means coupled to said circuit means for shifting the phase of the signal received therefrom by 90° phase comparator means coupled to said 90° phase-shifting means and said second winding, said phase comparator means being responsive to the 90° phase-shifted signal and said difference signal to measure the phase angle therebetween and thereby the velocity and direction of flow of the liquid.